INDRAVADAN S. SHAH
ALEXANDER KIRSCHNER
INVENTORS.

United States Patent Office 3,567,194
Patented Mar. 2, 1971

3,567,194
WET APPROACH VENTURI SCRUBBER
Indravadan S. Shah, Forest Hills, and Alexander Kirschner, Brooklyn, N.Y., assignors to Chemical Construction Corporation, New York, N.Y.
Filed June 20, 1969, Ser. No. 835,157
Int. Cl. B01f 3/04
U.S. Cl. 261—118                                    19 Claims

ABSTRACT OF THE DISCLOSURE

A venturi-type gas scrubber is provided which features a liquid projection lip in the approach section of the venturi. Scrubbing liquid is passed downwards on the wall of the approach section and is projected into the accelerated gas stream by the lip, which terminates outside of the dimension of the throat section, so that the scrubbing liquid penetrates the gas stream through the entire throat section. In a preferred embodiment, the lip is removable and is disposed on a ring, with an additional frusto-conical baffle depending downwards from the lower surface of the lip adjacent to the ring and terminating inside the inner dimension of the lip. A central conical baffle may be provided, to define an annular venturi scrubbing passage.

BACKGROUND OF THE INVENTION

Field of the invention

Figure 1:
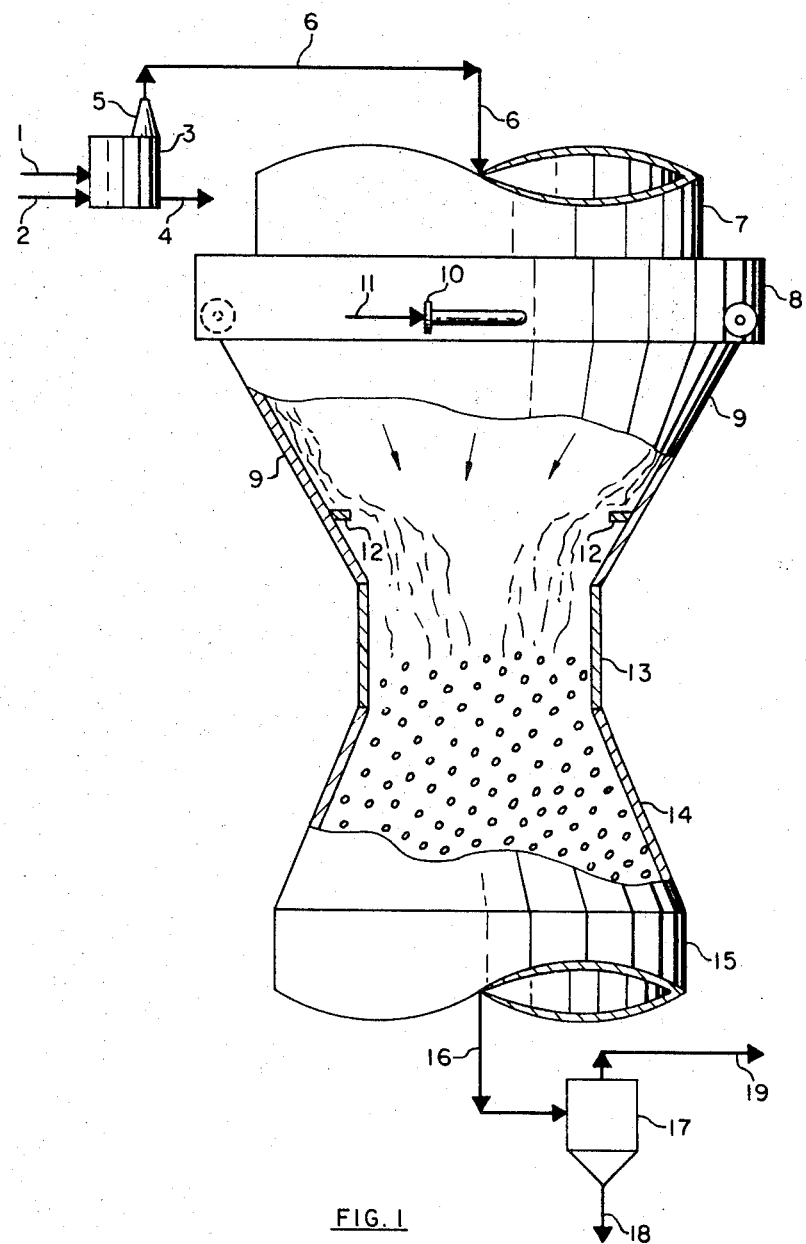

The invention relates to the scrubbing of gas streams with a liquid, to remove entrained solid particles or liquid droplets, or to selectively remove a gaseous or vapor component. The invention is particularly applicable to the scrubbing of waste or stack gases with water or an aqueous solution, to remove impurities such as fly ash or sulfur dioxide, and thereby prevent air pollution.

Description of the prior art

Numerous types of advices have been suggested in the prior art, for the scrubbing of a gas stream with a liquid solution. One of the most important types of devices employed for this purpose is a venturi scrubber, which accelerates the gas stream to high velocity in a venturi-type passage and projects the scrubbing liquid into the high velocity gas stream at or adjacent to the throat of the venturi. Numerous improvements in the basic venturi scrubber have been developed, as shown in U.S. Pats. Nos. 3,440,803; 3,353,803; 3,262,685; 3,215,415; 3,057,605 and 2,883,167 and Canadian Pat. No. 693,349. The annular venturi configuration useful in scrubbing large volumes of gas with low pressure drop, is shown in U.S. patent applications Nos. 753,583 filed Aug. 19, 1968 and now allowed and 808,517 filed Mar. 19, 1969; and U.S. Pats. Nos. 3,317,197 and 3,085,793. In certain of the patents cited supra, a venturi configuration is shown in which a projection lip is provided at the base of the approach or converging section of the venturi, for projecting the downflowing scrubbing liquid into the gas stream.

SUMMARY OF THE INVENTION

In the present invention, a modified wet approach venturi scrubber is provided, with respect to the prior art venturi scrubber configuration in which the scrubbing liquid flows downwards on the wall of the converging approach section for projection into the gas stream within the throat section. It has been determined that improved results are attained by the provision of a projection lip within the approach section and spaced above the throat section, with the lip terminating with a greater dimension or diameter than the throat itself. In a preferred embodiment, an annular venturi configuration is provided, in which the central conical baffle is also provided with a projection lip which is spaced above the lower terminus of the conical baffle and has an outer dimension or diameter less than the dimension of the base of the conical baffle.

There are several salient advantages to the apparatus of the present invention, as contrasted to prior art devices in which a projection lip is disposed at the base of the approach or converging section and therefore at the top of the throat section. The apparatus of the present invention produces an effectively longer zone of high velocity turbulence due to earlier distribution of liquid, assuming an equal trajectory of liquid. However, since the liquid is introduced at an upper plane where a lower gas velocity occurs than at the throat itself, greater distance of penetration into the gas stream occurs, resulting in a greater effective length of high velocity turbulent zone. In effect, one of the advantageous results of the invention is that a uniformly turbulent zone is established throughout the length of the throat. In addition, due to this greater penetration, a wider throat may be used for any given gas velocity than is possible in prior art configurations. Another important factor and advantage is the influence of the upwardly displaced projection lip in breaking cohesive contact between the wet approach cone and the flowing liquid. This provides more effective fragmentation of the scrubbing liquid, and minimizes short circuiting of a scrubbing liquid film or layer along the surface of the throat.

It is an object of the present invention to provide an improved apparatus for scrubbing a gas stream with a liquid.

Another object is to provide an improved venturi-type gas scrubber.

A further object is to provide an improvement is venturi-type gas scrubbers in which the scrubbing liquid flows downwards on the inner wall of the converging approach section of the venturi.

An additional object is to project scrubbing liquid into the high velocity gas stream in a venturi scrubber in an improved manner.

Still another object is to provide a venturi-type gas scrubber which may be readily fabricated and assembled.

Still a further object is to provide a wet approach venturi gas scrubber in which a uniformly turbulent gas-liquid mixing and contact zone is provided throughout the throat of the venturi passage.

An object is to prevent short circuiting of films or layers of scrubbing liquid in the venturi throat of a venturi-type gas scrubber in which the scrubbing liquid flows downwards on the inner wall of the converging approach section of the venturi.

These and other objects and advantages of the present invention will become evident from the description which follows.

DESCRIPTION OF THE DRAWINGS AND PREFERRED EMBODIMENTS

Figure 2:
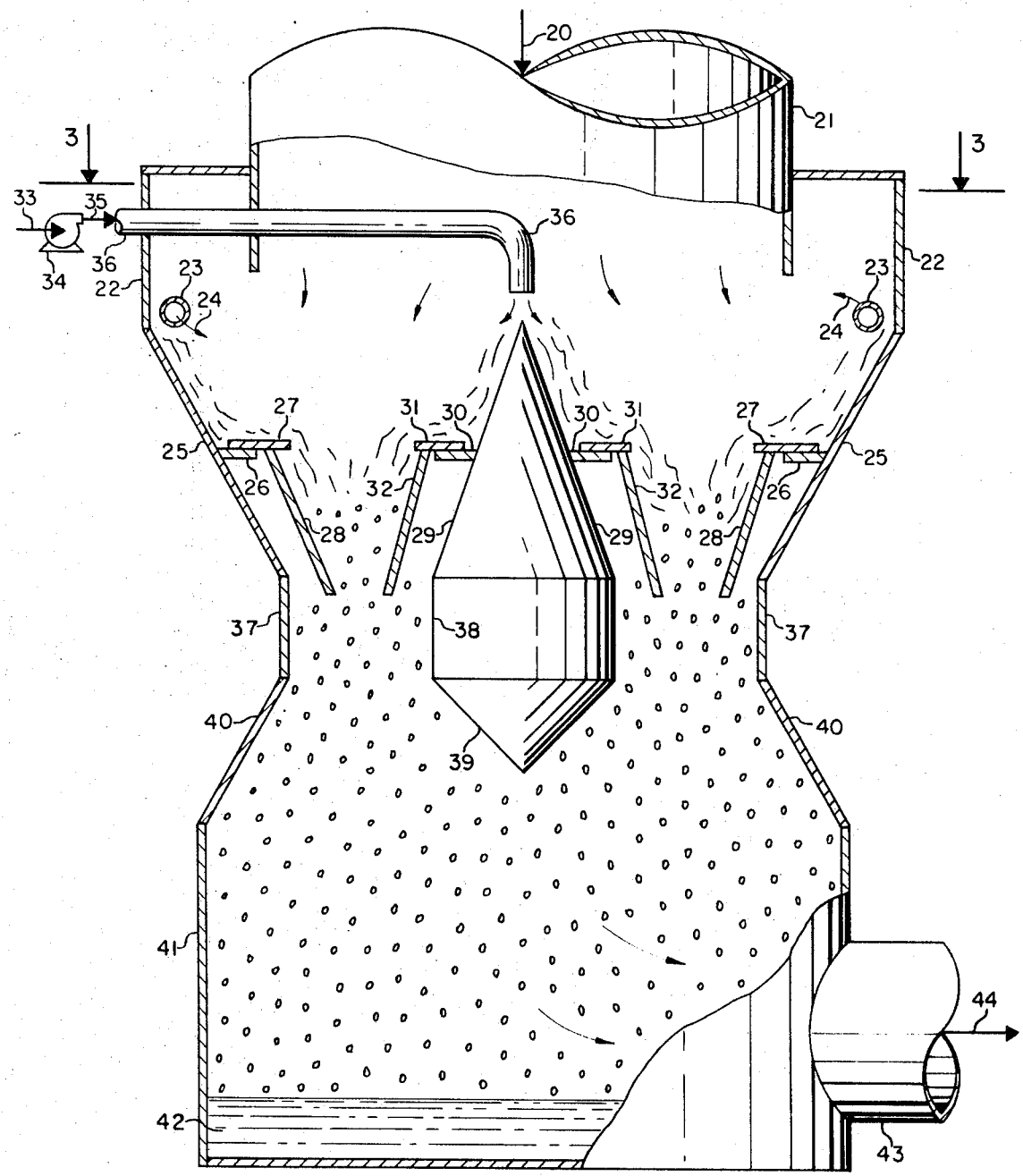
Figure 3:
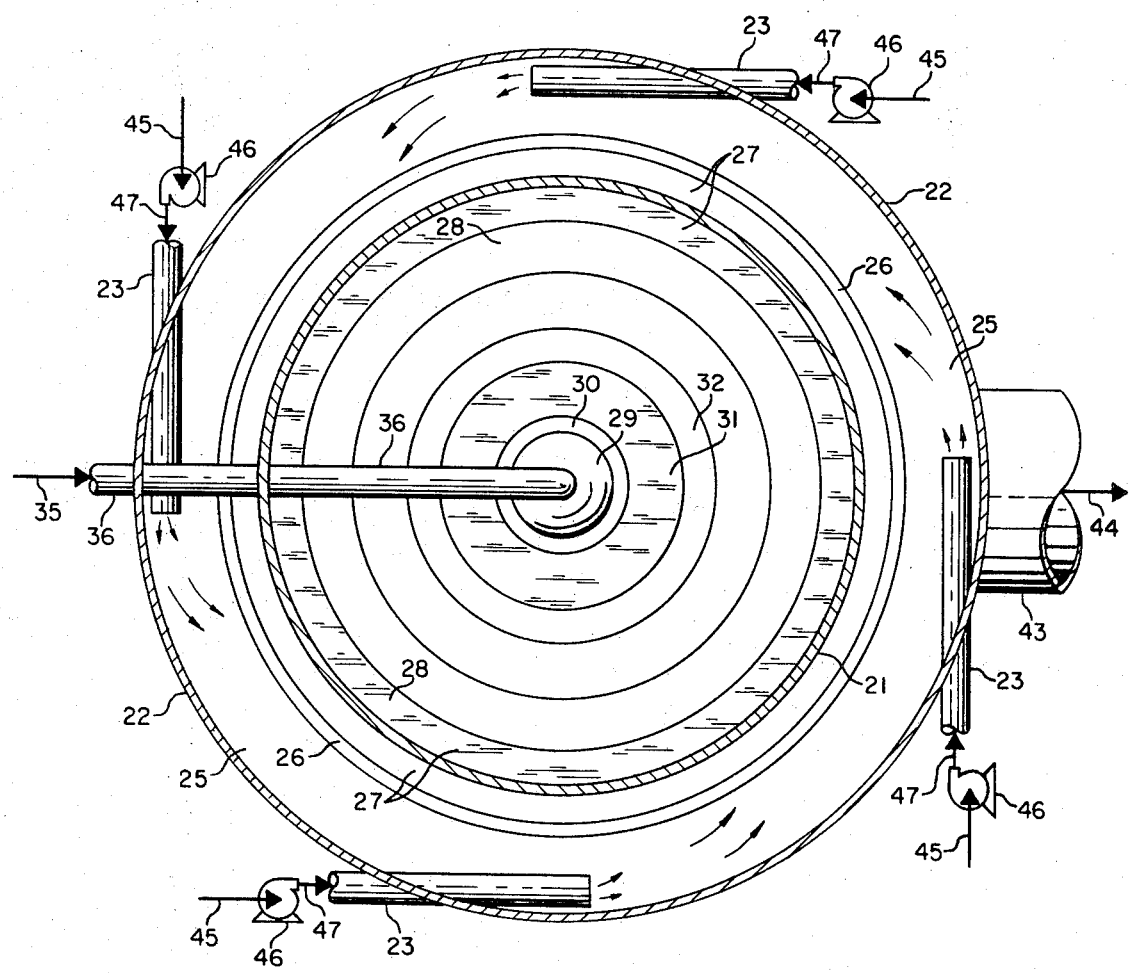
Figure 4:
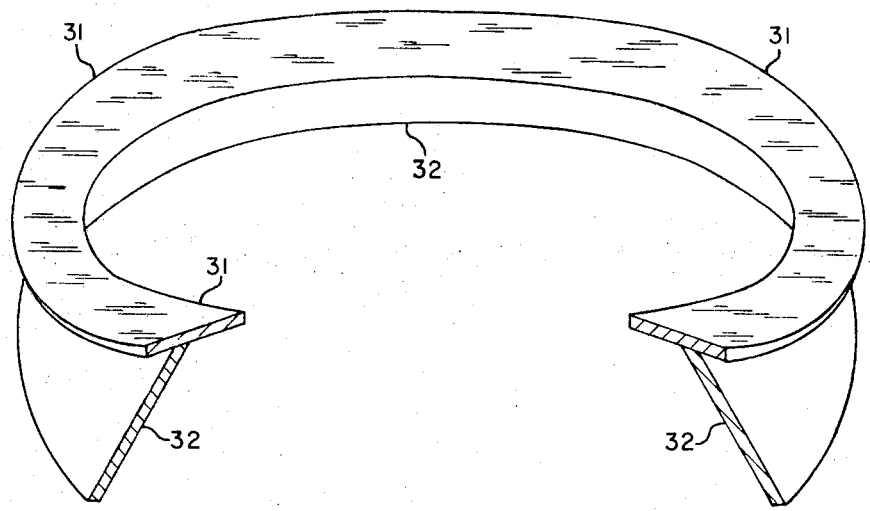
Figure 4:
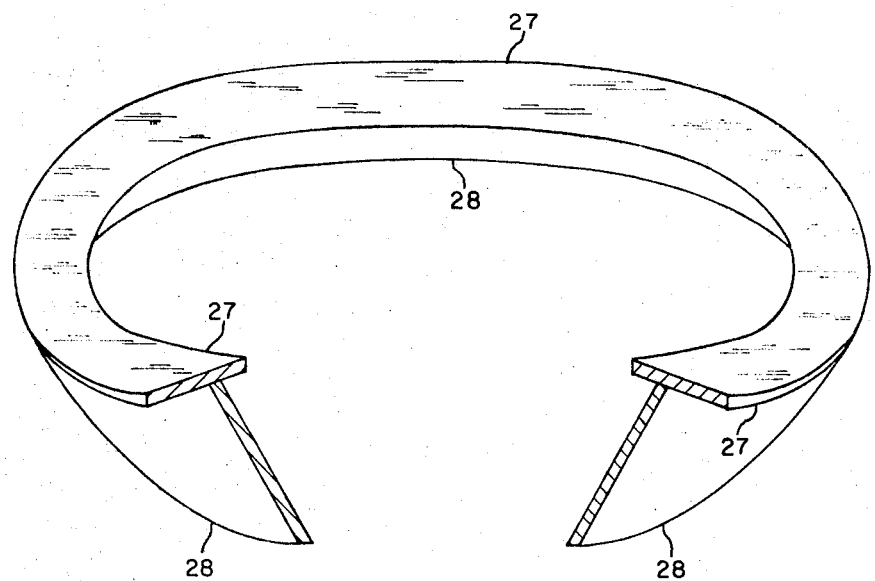

Referring now to the drawings: FIG. 1 is a sectional elevation view of a generalized embodiment of the invention, FIG. 2 is a sectional elevation view of a preferred embodiment of the invention as applied to an annular venturi scrubber, FIG. 3 is a plan view of FIG. 2, taken on section 3—3, and FIG. 4 shows typical throat inserts, applicable to the device of FIG. 1 or the approach members of FIG. 2.

Referring now to FIG. 1, which shows a typical application of the device of the invention to the scrubbing of a flue gas or other waste gas derived from a steam power boiler or the like, fuel stream 1, which may consist of any suitable gaseous, liquid or solid fuel such as a fluid hydrocarbon or coal, is passed together with combustion air stream 2 into steam power boiler 3, for the generation of high pressure steam for electricity production. Solid ash is removed from unit 3 via stream 4, and the generated combustion flue gas containing entrained solid fly ash and sulfur dioxide is also removed from unit 3 via outlet stack 5, which in typical prior art practice discharges the flue gas to the atmosphere with resultant air pollution. In the present invention, the flue gas passes from unit 5 via stream 6, which flows downwards through the vertically oriented conduit 7 and into the apparatus of the present invention.

Conduit 7 extends downwards and connects with the annular collar or trough 8, which connects conduit 7 with the inverted frusto-conical approach or converging baffle 9, which defines the converging section of the venturi passage. The annular tangential nozzles 10 are provided in the collar 8, and serve to pass scrubbing liquid streams such as stream 11 onto the inner surface of baffle 9, so that the scrubbing liquid flows downwards on the inner surface of baffle 9 in a whirling spiral flow path. Stream 11 may consist of water or a suitable aqueous alkaline solution which dissolves sulfur dioxide, in addition to scrubbing fly ash from the gas stream.

The scrubbing liquid film or layer which flows downwards on the inner surface of baffle 9 is projected by lip 12 into the accelerated gas stream, which flows at high velocity through the lower portion of the venturi passage defined by baffle 9 and the cylindrical throat section baffle 13, which depends downwards from baffle 9. The lip 12 is a generally horizontal ring-shaped annular member, which extends inwards from the inner surface of baffle 9 and terminates at a circular inner perimeter which is of greater diameter than the diameter of baffle 13, so that a convergence of a gas flow passage takes place between lip 12 and baffle 13. The liquid which is projected into the gas stream by lip 12 is dispersed into small droplets above and at the entry into the throat section defined by baffle 13, and effective scrubbing of the highly accelerated gas stream takes place within the throat section.

The resulting mixture of dispersed liquid droplets in the gas stream next flows downwards through the frusto-conical baffle 14, which depends downwards from baffle 13 and is provided to promote recovery of gas pressure head without turbulence, thus providing a minimum overall loss of gas pressure or pressure drop through the device. The gas-liquid mixture next flows through cylindrical conduit 15, which depends from baffle 14 and conducts the mixture via stream 16 to the gas-liquid separator 17, which is a baffled or cyclonic vessel for the separation of scrubbed gas from the entrained liquid phase. The separated scrubbing liquid, now containing fly ash and sulfur dioxide removed from the flue gas, is removed from separator 17 via stream 18, which is discharged to waste or processed for recovery of dissolved sulfur dioxide or sulfites. The scrubbed flue gas is discharged from unit 17 via stream 19, which may now be safely discharged to the atmosphere without causing air pollution.

Referring now to FIG. 2, a preferred embodiment of the invention is shown, in which an annular venturi scrubber is provided to attain the scrubbing of large gas volume with low pressure drop. Waste or flue gas stream 20, which may be similar to stream 6 described supra, is passed downwards through the vertically oriented cylindrical conduit 21. An outer cylindrical conduit 22 is disposed about the lower end of conduit 21, and the top of conduit 22 is connected with conduit 21 by a fluid-impervious baffle or other suitable connection. A plurality of horizontal liquid discharge pipes 23 are tangentially disposed adjacent to the base of conduit 22, and tangentially discharge the scrubbing liquid streams 24 within conduit 22 and at the top of the inverted frusto-conical baffle 25, which depends downwards from conduit 22. The scrubbing liquid flows downwards on the inner surface of conduit 25 in a spiral of whirling flow path.

An annular support member 25, which is of a general configuration similar to lip 12 described supra, is disposed on the inner surface of baffle 25, and member 26 extends inwards and supports the annular liquid projection lip 27, which is a generally flat ring-shaped annular baffle or lip which is preferably removable and is mounted on or rests on member 26. An inverted frusto-conical baffle 28 extends downwards and inwards from the lower surface of member 27, and baffle 28 terminates at a lower circular perimeter which is of lesser diameter than the diameter of the inner perimeter of member 27, so that baffle 28 extends further into the gas stream than baffle 27. The downflowing liquid stream on the surface of baffle 25 is projected into the gas stream by lip 27 above baffle 28, and the liquid is thereby dispersed into the high velocity gas stream as small discrete droplets and particles of liquid.

A central conical baffle 29 is mounted or otherwise disposed coaxially within baffle 25, with the apex of baffle 29 extending upwards and opposed to downwards gas flow from conduit 21. An annular support 30 consisting generally of a flat horizontal ring extends outwards from the side wall of baffle 29, and support 30 will preferably be spaced opposite to and on the same vertical elevation as support 26. The support 30 will be of a general configuration similar to lip 12 described supra, except that support 30 extends outwards from the conical surface 29. Member 30 extends outwards and supports the annular liquid projection lip 31, which is a generally flat ring-shaped annular baffle or lip which is preferably removable and is mounted on or rests on member 30. A frust-conical baffle 32 extends downwards and outwards from the lower surface of member 31, and baffle 32 terminates at lower circular perimeter which is of greater diameter than the outer perimeter of member 31, so that baffle 32 extends further into the gas stream than baffle 31.

Scrubbing liquid stream 33 is pumped via pump 34 as stream 35 through pipe 36, which extends through members 22 and 21 and terminates centrally with a vertically downward extension, so that pipe 36 discharges scrubbing liquid centrally at the apex of baffle 29, and the scrubbing liquid flows downwards on the outer surface of baffle 29 and is projected outwards into the gas stream by lip 31. The lips 27 and 31 thus project scrubbing liquid into the annular venturi passage which is generally defined by the convergence of baffles 25 and 29, together with the convergence of baffles 28 and 32. The annular venturi passage is further defined by the vertical cylindrical baffle 37, which depends downwards from baffle 25, and the vertical cylindrical baffle 38, which depends downwards from the base of baffle 29. The baffles 37 and 38 define the throat section of the annular venturi passage. An inverted conical baffle 39 preferably depends downwards from baffle 38, and a frusto-conical baffle 40 preferably depends downwards from baffle 37, so that the baffles 39 and 40 define the diverging outlet section of the annular venturi passage. The gas stream is accelerated to high velocity in the annular venturi passage, and the liquid films or layers projected into the gas stream by lips 29 and 31 are dispersed into a plurality of droplets in and above the throat section of the annular venturi passage, so that effective gas scrubbing is accomplished with low pressure drop.

The resulting mixture of scrubbed gas and entrained liquid droplets flows downwards from the annular venturi passage into a primary liquid separation chamber generally defined by vertical cylindrical conduit 41, which depends downwards from baffle 40. Separated liquid collects in the bottom of the chamber as pool 42, and may be continuously or intermittently withdrawn. The scrubbed gas stream, which may contain residual entrained liquid droplets, is removed from the device via duct 43 as stream 44, which may be processed in a manner similar to stream 16 as described supra. The excess liquid from pool 42 is withdrawn via duct 43 as an overflow stream of excess liquid.

FIG. 3 is a sectional plan view of FIG. 2, taken on section 3—3, and shows the coaxial and concentric arrangement of the various apparatus elements in circular plan section, as well as various appurtenances. The scrubbing liquid streams 45 pass via pumps 46 as streams 47 through pipes 23, for tangential discharge onto the upper surface of baffle 25.

FIG. 4 is a sectional isometric view of the added removable baffles provided in the approach section of the annular venturi passage of FIG. 2, and the structures illustrated in FIG. 4 may be designated as removable throat inserts. The throat insert element formed by baffles 27 and 28 may also be utilized in some cases in the device of FIG. 1, in which case the baffle 27 would rest or be mounted on lip 12, with the liquid streams 11 being projected into the gas stream by baffle 27.

Numerous alternatives within the scope of the present invention besides those mentioned supra will occur to those skilled in the art. The throat inserts defined respectively by baffles 27 and 28, and baffles 31 and 32, may be omitted from the device of FIG. 2 in some instances, in which case the liquid films flowing downwards on the surfaces of baffles 25 and 29 would be projected into the accelerated gas stream by lips 26 and 30. In some cases, when gas pressure drop is not a major consideration, a modified venturi arrangement consisting primarily of an approach or converging section may be provided in practice, in which case certain baffles such as 14, or 37, 38, 39 and 40, may be omitted, with the gas-liquid mixture discharging into a lower chamber from the converging passage. The device of the present invention is applicable to the scrubbing of various types of process or waste gas streams, such as incinerator off-gases or the tail gas from chemical processes such as sulfuric acid manufacture. A bull nozzle, or a series of nozzles, may be provided in practice above or within the approach sections of the venturi devices of the present invention, to spray scrubbing liquid downwards into the throat section of the device. The device of FIG. 2 may be modified in practice, by the provision of an annular ring-shaped baffle having an upper angular projection within the annular throat section, so as to provide two concentric annular venturi passages, as described in U.S. patent application No. 808,517 mentioned supra.

We claim:

1. An apparatus for scrubbing a gas stream with a liquid which comprises an inverted frusto-conical baffle, a cylindrical baffle, said cylindrical baffle depending downwards from said inverted frusto-conical baffle and serving to define the throat section of a vertical venturi passage, means to pass an impurity-laden gas stream downwards through said vertical venturi passage defined by said inverted frusto-conical baffle and said cylindrical baffle, whereby said gas stream is accelerated to a high velocity within said vertical venturi passage, a substantially horizontal annular projection lip, said lip extending inwards from the inner surface of said inverted frusto-conical baffle above the lower terminus of said inverted frusto-conical baffle and terminating at a circular inner perimeter which is of greater diameter than the diameter of said cylindrical baffle, means to pass a scrubbing liquid downwards on the inner surface of said inverted frusto-conical baffle, whereby said liquid is projected by said lip into said gas stream above the lower terminus of said inverted frusto-conical baffle and is thereby uniformly dispersed into said gas stream within substantially all of the throat section of said venturi passage defined by said cylindrical baffle, and means to separate the mixed gas-liquid stream discharged from the lower end of said cylindrical baffle into a scrubbed gas stream and a scrubbing liquid stream containing impurity removed from said gas stream.

2. The apparatus of claim 1, in which a frusto-conical baffle depends downwards from said cylindrical baffle, whereby the mixed gas-liquid stream discharged from the lower end of said cylindrical baffle flows downwards through said frusto-conical baffle prior to passing to said means for separating the mixed gas-liquid stream into gaseous and liquid components.

3. The apparatus of claim 1, in which said impurity-laden gas stream contains entrained solid particles, and said solid particles are removed from said gas stream into said scrubbing liquid.

4. The apparatus of claim 1, in which said means to pass a scrubbing liquid downwards on the inner surface of said inverted frusto-conical baffle comprises a plurality of liquid discharge pipes, said pipes being substantially tangential to said inverted frusto-conical baffle and discharging liquid streams in tandem, whereby scrubbing liquid flows downwards on the inner surface of said inverted frusto-conical baffle in a spiral flow pattern.

5. The apparatus of claim 4, in which said pipes are substantially horizontal.

6. An apparatus for scrubbing a gas stream with a liquid which comprises a vertically oriented cylindrical conduit, means to pass an impurity-laden gas stream downwards through said conduit, a conical baffle, said conical baffle being disposed at the lower outlet of said conduit and coaxially aligned with said conduit, with the apex of said conical baffle extending upwards and opposed to gas flow, a first substantially horizontal annular projection lip, said first lip extending outwards from the outer surface of said conical baffle above the lower terminal perimeter of said conical baffle and terminating at a circular outer perimeter which is of smaller diameter than the diameter of the lower terminal perimeter of said conical baffle, means to pass a first scrubbing liquid stream downwards on the outer surface of said conical baffle, whereby said first liquid stream is projected by said first lip into said gas stream above the lower end of said conical baffle and is dispersed outwards and into said gas stream adjacent to the lower end of said conical baffle, an inverted frusto-conical baffle, said inverted frusto-conical baffle being concentrically disposed external to said conical baffle and spaced away from said conical baffle, whereby a downwardly converging annular gas passage is defined between said inverted frusto-conical baffle and said conical baffle, the lower end of said inverted frusto-conical baffle terminating adjacent to the lower end of said conical baffle, fluid closure means extending between the upper end of said inverted frusto-conical baffle and said conduit, a second substantially horizontal annular projection lip, said second lip extending inwards from the inner surface of said inverted frusto-conical baffle above the lower terminal perimeter of said inverted frusto-conical baffle and terminating at a circular inner perimeter which is of greater diameter than the diameter of the lower terminal perimeter of said inverted frusto-conical baffle, means to pass a second scrubbing liquid stream downwards on the inner surface of said inverted frusto-conical baffle, whereby said second liquid stream is projected by said second lip into said gas stream above the lower end of said inverted frusto-conical baffle and is dispersed inwards and into said gas stream adjacent to the lower end of said inverted frusto-conical baffle, and means to separate the mixed gas-liquid stream discharged below said baffles into a scrubbed gas stream and a scrubbing liquid stream containing impurity removed from said gas stream.

7. The apparatus of claim 6, in which a first cylindrical baffle depends downwards from said conical baffle, and a second cylindrical baffle depends downwards from said inverted frusto-conical baffle, said second cylindrical baffle being concentrically disposed about said first cylindrical baffle, whereby said first and second cylindrical baffles define the annular throat section of an annular vertical venturi passage.

8. The apparatus of claim 7, in which an inverted conical baffle depends downwards from said first cylindrical baffle, and a frusto-conical baffle depends downwards from said second cylindrical baffle, whereby the mixed gas-liquid stream discharged from the annular throat section of said annular vertical venturi passage flows downwards through a diverging passage defined between said baffles depending from said cylindrical baffles, prior to passing to said means for separating the mixed gas-liquid stream into gaseous and liquid components.

9. The apparatus of claim 6, in which said impurity-laden gas stream contains entrained solid particles, and said solid particles are removed from said gas stream into said scrubbing liquid.

10. The apparatus of claim 6, in which said means to pass said second scrubbing liquid stream downwards on the inner surface of said inverted frusto-conical baffle comprises a plurality of liquid discharge pipes, said pipes being substantially tangential to said inverted frusto-conical baffle and discharging liquid streams in tanden, whereby scrubbing liquid flows downwards on the inner surface of said inverted frusto-conical baffle in a spiral flow pattern.

11. The apparatus of claim 10, in which said pipes are substantially horizontal.

12. The apparatus of claim 6, in which said means to pass a first scrubbing liquid stream downwards on the outer surface of said conical baffle comprises a pipe, said pipe terminating with a substantially vertical section which is above and coaxial with said conical baffle, with the lower terminal liquid outlet end of the vertical section of said pipe being adjacent to the apex of said conical baffle, together with means to pass said first scrubbing liquid stream through said pipe.

13. An apparatus for scrubbing a gas stream with a liquid which comprises a vertically oriented cylindrical conduit, means to pass an impurity-laden gas stream downwards through said conduit, a conical baffle, said conical baffle being disposed at the lower outlet of said conduit and coaxially aligned with said conduit, with the apex of said conical baffle extending upwards and opposed to gas flow, a first substantially horizontal support ring, said first ring extending outwards from the outer surface of said conical baffle above the lower terminal perimeter of said conical baffle, a first substantiallly horizontal annular projection lip, said first lip being of flat ring-shaped form and being mounted on said first support ring, a frusto-conical baffle, said frusto-conical baffle depending downwards from the lower surface of said first lip adjacent to said first ring and terminating with a lower circular perimeter which is of greater diameter than the outer diameter of said first lip, means to pass a first scrubbing liquid stream downwards on the outer surface of said conical baffle, whereby said first liquid stream is projected by said first lip into said gas stream above the lower end of said frusto-conical baffle and is dispersed outwards and into said gas stream adjacent to the lower end of said frusto-conical baffle, a first inverted frusto-conical baffle, said first inverted frusto-conical baffle being concentrically disposed external to said conical baffle and spaced away from said conical baffle, whereby a downwardly converging annular gas passage is defined between said first inverted frusto-conical baffle and said conical baffle, the lower end of said first inverted frusto-conical baffle terminating adjacent to the lower end of said conical baffle, fluid closure means extending between the upper end of said first inverted frusto-conical baffle and said conduit, a second substantially horizontal support ring, said second ring extending inwards from the inner surface of said first inverted frusto-conical baffle above the lower terminal perimeter of said first inverted frusto-conical baffle, a second substantially horizontal annular projection lip, said second lip being of flat ring-shaped form and being mounted on said second support ring, a second inverted frusto-conical baffle, said second inverted frusto-conical baffle depending downwards from the lower surface of said second lip adjacent to said second ring and terminating with a lower circular perimeter which is of smaller diameter than the inner diameter of said second lip, means to pass a second scrubbing liquid stream downwards on the inner surface of said first inverted frusto-conical baffle, whereby said second liquid stream is projected by said second lip into said gas stream above the lower end of said second inverted frusto-conical baffle and is dispersed inwards and into said gas stream adjacent to the lower end of said second inverted frusto-conical baffle, and means to separate the mixed gas-liquid stream discharged below said baffles into a scrubbed gas stream and a scrubbing liquid stream containing impurity removed from said gas stream.

14. The apparatus of claim 13, in which a first cylindrical baffle depends downwards from said conical baffle, and a second cylindrical baffle depends downwards from said first inverted frusto-conical baffle, said second cylindrical baffle being concentrically disposed about said first cylindrical baffle, whereby said first and second cylindrical baffles define the annular throat section of an annular vertical venturi passage.

15. The apparatus of claim 14, in which an inverted conical baffle depends downwards from said first cylindrical baffle, and a frusto-conical baffle depends downwards from said second cylindrical baffle, whereby the mixed gas-liquid stream discharged from the annular throat section of said annular vertical venturi passage flows downwards through a diverging passage defined between said baffles depending from said cylindrical baffles, prior to passing to said means for separating the mixed gas-liquid stream into gaseous and liquid components.

16. The apparatus of claim 13, in which said impurity-laden gas stream contains entrained solid particles, and said solid particles are removed from said gas stream into said scrubbing liquid.

17. The apparatus of claim 13, in which said means to pass said second scrubbing liquid stream downards on the inner surface of said first inverted frusto-conical baffle comprises a plurality of liquid discharge pipes, said pipes being substantially tangential to said first inverted frusto-conical baffle and discharging liquid streams in tandem, whereby scrubbing liquid flows downwards on the inner surface of said first inverted frusto-conical baffle in a spiral flow pattern.

18. The apparatus of claim 17, in which said pipes are substantially horizontal.

19. The apparatus of claim 13, in which said means to pass a first scrubbing liquid stream downwards on the outer surface of said conical baffle comprises a pipe, said pipe terminating with a substantially vertical section which is above and coaxial with said conical baffle, with the lower terminal liquid outlet end of the vertical section of said pipe being adjacent to the apex of said conical baffle, together with means to pass said first scrubbing liquid stream through said pipe.

References Cited

UNITED STATES PATENTS

| 3,085,793 | 4/1963 | Pike et al. | 261—V.S. |
| 3,215,415 | 11/1965 | Stephens et al. | 261—118 |
| 3,331,591 | 7/1967 | Dell'Agnese et al. | 261—V.S. |
| 3,448,562 | 6/1969 | Wisting | 261—V.S. |

FOREIGN PATENTS

| 142,445 | 7/1920 | Great Britain | 261—118 |

TIM R. MILES, Primary Examiner